(12) United States Patent
Zakuskin

(10) Patent No.: US 8,613,332 B2
(45) Date of Patent: Dec. 24, 2013

(54) REMOVABLE TRACK DRIVE

(75) Inventor: Yuriy Zakuskin, Orekhov (UA)

(73) Assignee: OAK Novations, Ltd., Middlesex, NJ (US)

( * ) Notice: Subject to any disclaimer, the term of this patent is extended or adjusted under 35 U.S.C. 154(b) by 92 days.

(21) Appl. No.: 13/345,670

(22) Filed: Jan. 7, 2012

(65) Prior Publication Data

US 2013/0175101 A1 Jul. 11, 2013

(51) Int. Cl.
*B62D 55/04* (2006.01)

(52) U.S. Cl.
USPC ........................................................ 180/9.26

(58) Field of Classification Search
USPC .......... 180/198, 9.26; 305/100, 120, 193, 195
See application file for complete search history.

(56) References Cited

U.S. PATENT DOCUMENTS

| | | | | |
|---|---|---|---|---|
| 1,437,408 A * | 12/1922 | Estes | ............................ | 180/185 |
| 1,558,432 A * | 10/1925 | Wilson | ........................ | 180/9.28 |
| 1,810,138 A * | 6/1931 | Kincannon | .................... | 305/126 |
| 3,801,164 A * | 4/1974 | Mazzarins | ..................... | 305/126 |
| 3,860,080 A * | 1/1975 | Firstenberg | ..................... | 180/9.1 |
| 4,620,602 A * | 11/1986 | Capriotti | ....................... | 180/9.21 |
| 5,240,084 A * | 8/1993 | Christianson | ................ | 180/9.21 |
| 5,388,656 A * | 2/1995 | Lagasse | ....................... | 180/9.21 |
| 5,924,503 A * | 7/1999 | Lykken | .......................... | 180/6.7 |
| 5,954,148 A * | 9/1999 | Okumura et al. | ............. | 180/9.21 |
| 6,068,353 A * | 5/2000 | Juncker et al. | ................ | 305/130 |
| 2005/0133281 A1* | 6/2005 | Boivin et al. | .................. | 180/9.1 |
| 2011/0254363 A1* | 10/2011 | Boivin | .......................... | 305/100 |

* cited by examiner

*Primary Examiner* — Tashiana Adams
(74) *Attorney, Agent, or Firm* — Cygnet IP Law, P.A.; Stephen W. Aycock, II

(57) ABSTRACT

A removable track drive can include a truck configured for supporting a vehicle tire and having two rollers adapted to contact respective surfaces of the vehicle tire. The removable track drive can also include a track disposed around an exterior of the truck and configured to pass over top of the vehicle tire so as to be moved by rotation of the vehicle tire. The removable track drive can also include a compulsory drive having a first rotating portion coupled to a vehicle wheel, a second rotating portion coupled to one of the rollers and a flexible drive member.

10 Claims, 9 Drawing Sheets

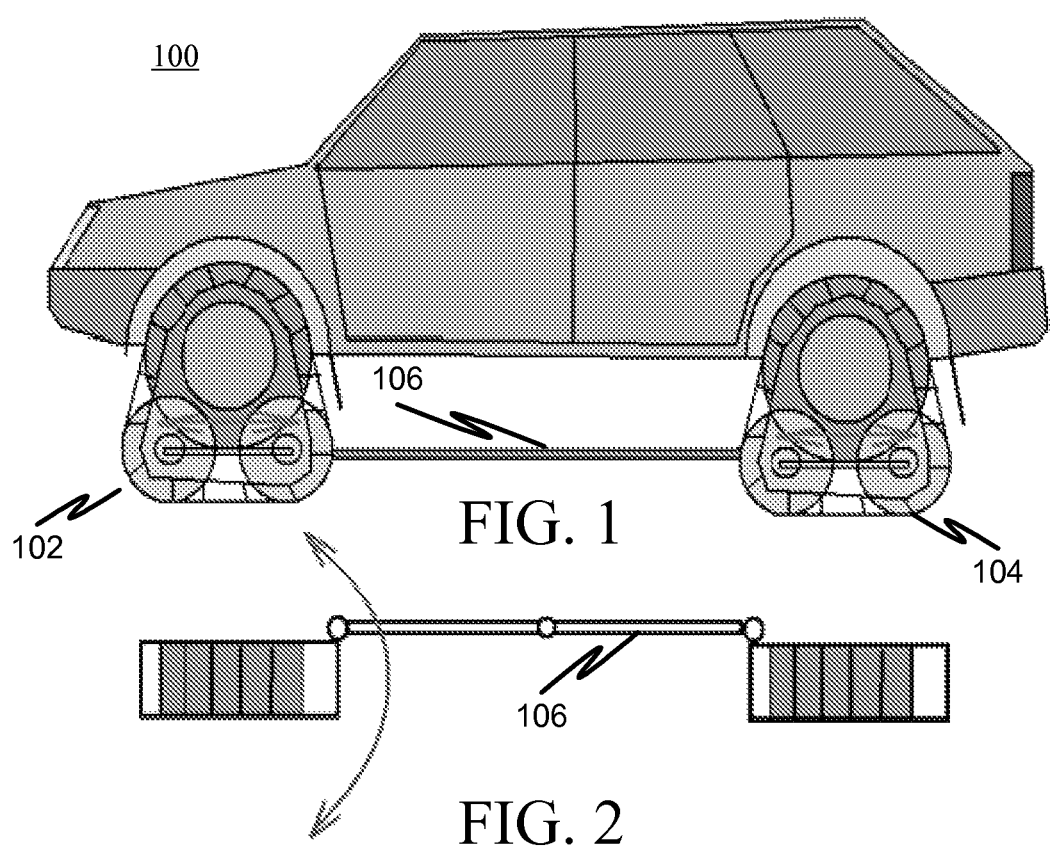

REMOVABLE TRACK DRIVE

Embodiments relate generally to track drives for vehicles, and, more particularly to a removable track drive.

Track drive vehicles typically have tracks that are permanently mounted and are driven by gears turned by a drive shaft. While track drive vehicles may be useful on snow, ice, dirt, mud or the like, a track drive vehicle may not be desirable on other surfaces.

One or more embodiments were conceived in light of the above-mentioned limitations or problems, among other things.

An embodiment can include a removable track drive having a truck configured for supporting a vehicle tire and having two rollers adapted to contact respective surfaces of the vehicle tire, and a track disposed around an exterior of the truck and configured to pass over top of the vehicle tire so as to be driven by rotation of the vehicle tire.

Another embodiment can include a removable track drive having a truck configured for supporting a vehicle tire and having two rollers adapted to contact respective surfaces of the vehicle tire, and a track disposed around an exterior of the truck and configured to pass over top of the vehicle tire so as to be moved (or driven) by rotation of the vehicle tire. The removable track drive can also include a compulsory drive having a first rotating portion coupled to a vehicle wheel, a second rotating portion coupled to one of the rollers and a flexible drive member.

BRIEF DESCRIPTION OF THE DRAWINGS

FIG. 1 is a diagram of an all-wheel drive vehicle equipped with exemplary removable track drives in accordance with at least one embodiment.

FIG. 2 is a diagram of an exemplary coupling rod in accordance with at least one embodiment.

DETAILED DESCRIPTION

In general, an embodiment can include a removable track drive that is driven by an existing wheel and tire of a vehicle, without a need to remove the wheel or tire. The removable track drive unit can fit around an existing wheel and is powered by the rotation of the wheel/tire.

FIG. 1 shows an all-wheel drive vehicle 100 equipped with exemplary removable track drives (102 and 104) and a coupling rod 106 that links the removable track drive (102 and 104).

In operation, as the wheels of the all wheel-drive vehicle 100 turn, tracks in each of the removable track drives (102 and 104) are moved.

The removable track drives (102 and 104) are coupled with the coupling rod 106 that prevents the track drives from rotating with the wheel rotation. FIG. 2 shows a top view of the coupling rod 106.

Figure 3:
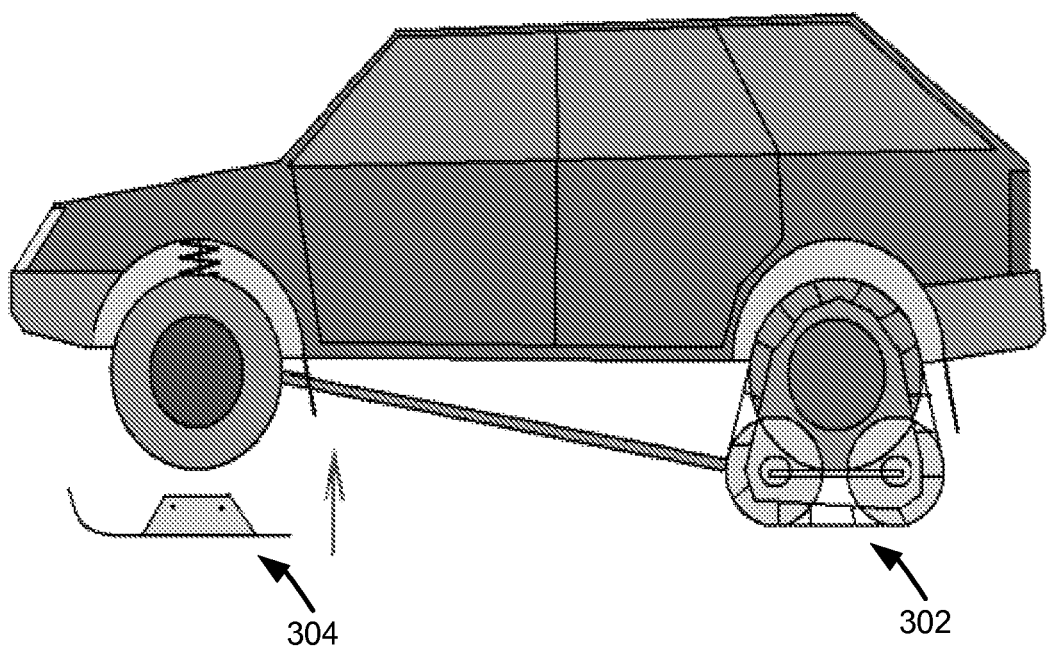
FIG. 3 is a diagram of a rear wheel drive vehicle equipped with an exemplary removable track drive in accordance with at least one embodiment.

FIG. 3 shows a rear wheel drive vehicle 300 equipped with an exemplary removable track drive 302. The vehicle can optionally be equipped with a front ski 304.

Figure 4:
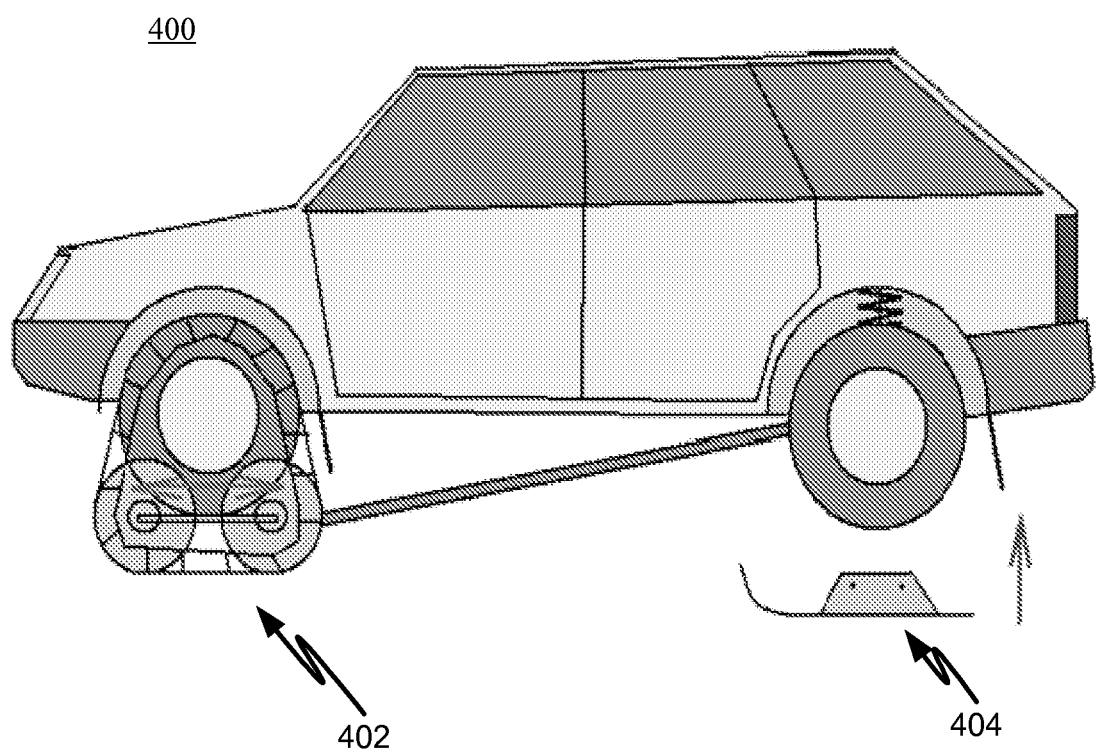
FIG. 4 is a diagram of a front wheel drive vehicle equipped with an exemplary removable track drive in accordance with at least one embodiment.

FIG. 4 shows a front wheel drive vehicle 400 equipped with an exemplary removable track drive 402. The vehicle can optionally be equipped with a rear ski 404.

Figures 5, 6:
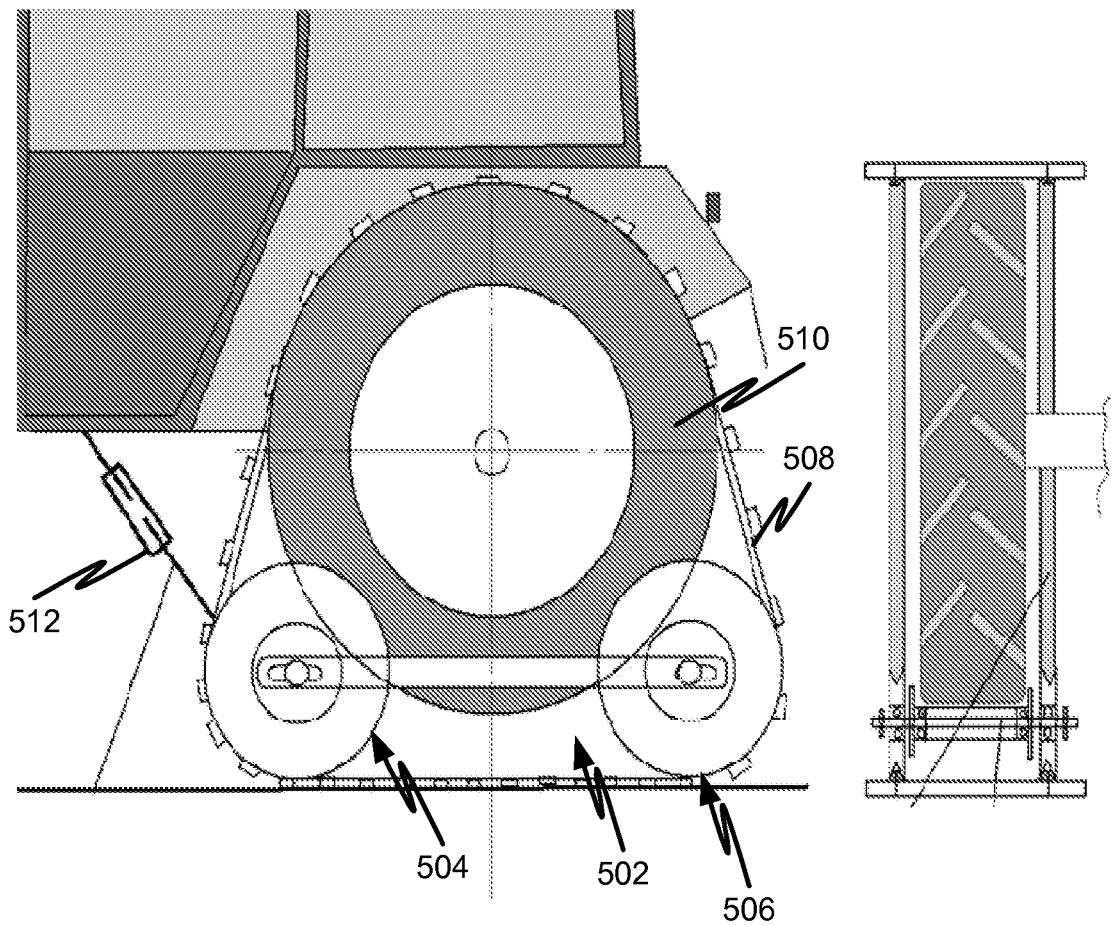
FIG. 5 is a side view of an exemplary removable track drive in accordance with at least one embodiment.
FIG. 6 is a rear view of an exemplary removable track drive in accordance with at least one embodiment.

FIG. 5 shows a side view of an exemplary removable track drive 500. The track drive 500 includes a truck 502 having a first roller 504 and a second roller 506. A track 508 extends around the truck 502 and over top of the tire 510. A coupling 512 couples the truck to the vehicle frame. FIG. 6 is a rear view of the track drive shown in FIG. 5.

The truck 502 can include rollers (504 and 506) that are adjustable on the truck.

Figure 7:
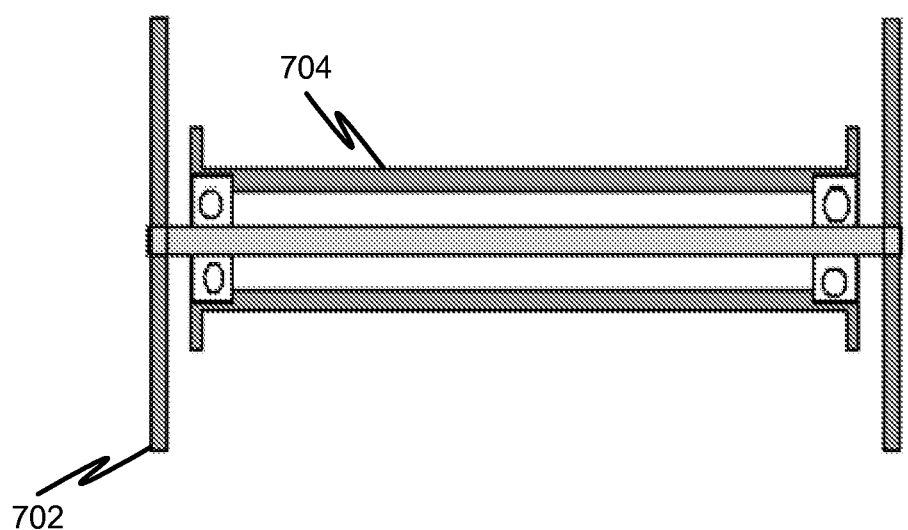
FIG. 7 is a diagram of an exemplary roller member in accordance with at least one embodiment.

FIG. 7 is a diagram of an exemplary roller member 700. The roller member 700 includes a track drive portion 702 and an inner portion 704 that rotates independently from the track drive portion 702.

Figure 8:
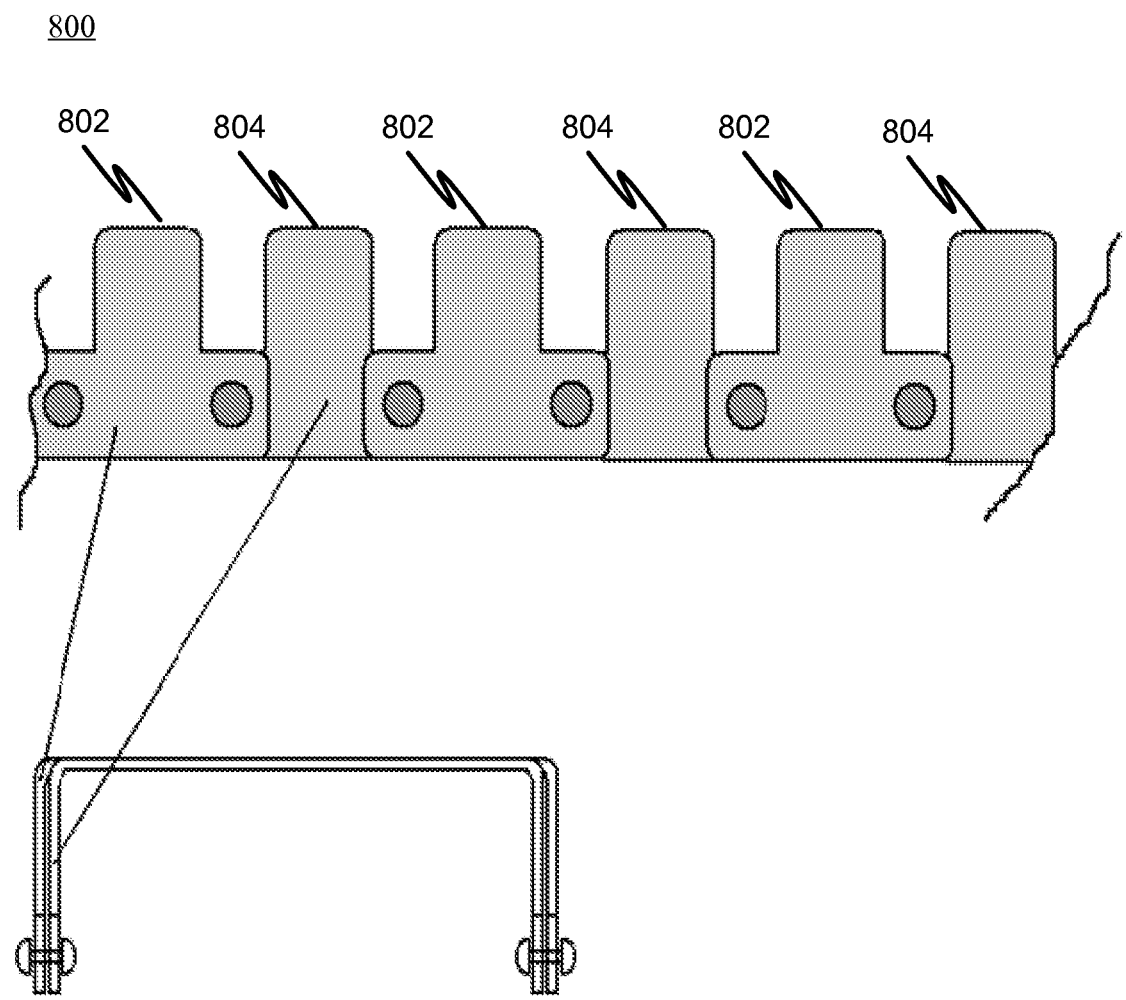
FIGS. 8-10 are diagrams of exemplary tracks in accordance with at least one embodiment.
Figure 9:
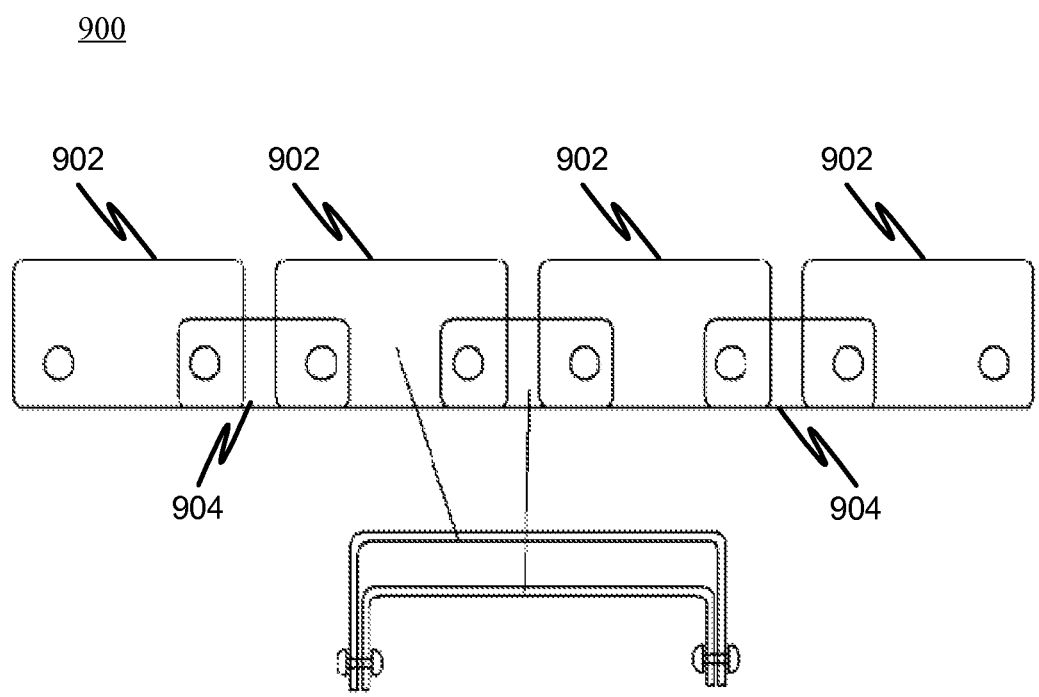
Figure 10:
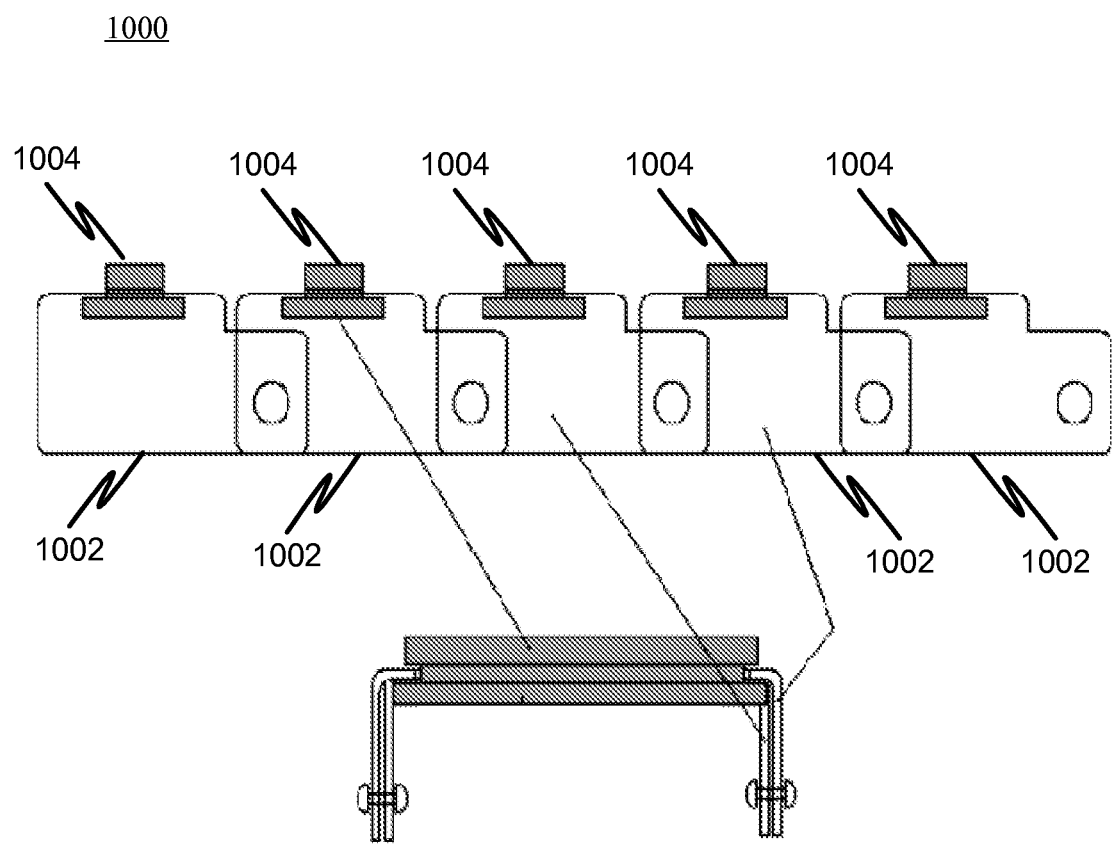

FIGS. 8-10 are diagrams of exemplary tracks in accordance with at least one embodiment. FIG. 8 shows a track 800 having a plurality of first members 802 and a plurality of second members 804.

FIG. 9 shows a track 900 having a plurality of first members 902 and a plurality of second members 904 shorter than the first members 902.

FIG. 10 shows a track 1000 having a plurality of first members 1002 that do not extend fully across the track, but instead have a plurality of second members 1004 that can include rubber inserts.

Figure 11:
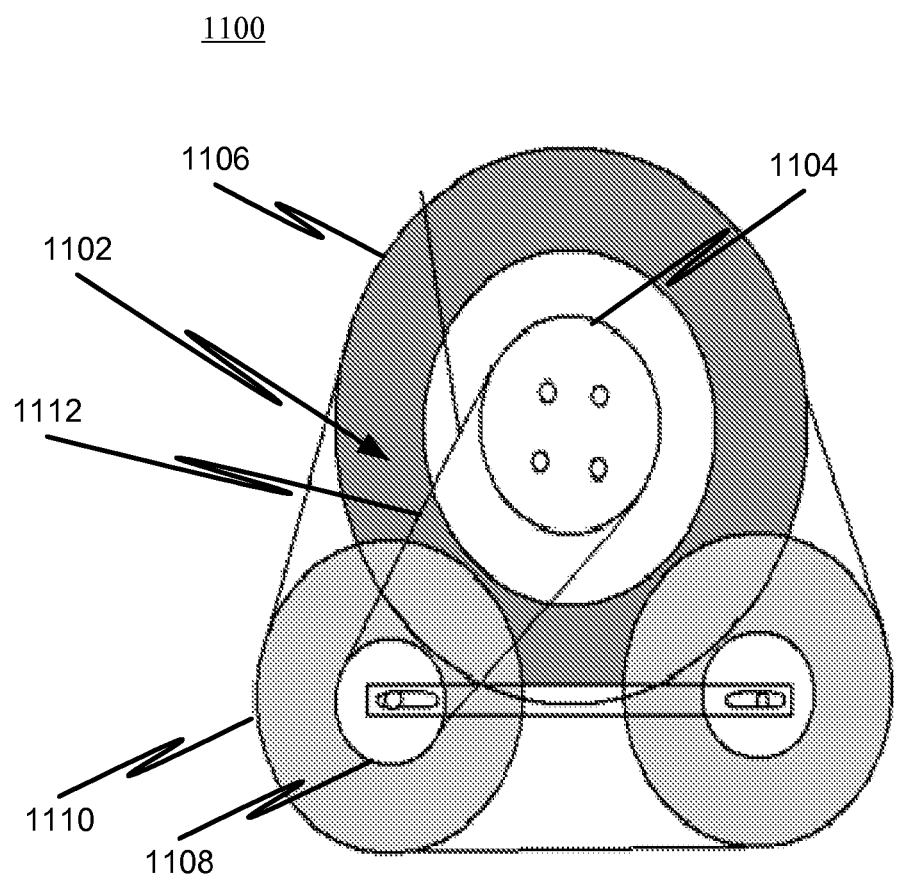
FIG. 11 is a diagram of an exemplary removable track drive having an auxiliary drive mechanism in accordance with at least one embodiment.

FIG. 11 shows an exemplary removable track drive 1100 that includes an auxiliary drive mechanism 1102. The auxiliary drive mechanism 1102 includes a first rotating member 1104 coupled to the wheel 1106 of a vehicle, a second rotating member 1108 coupled to a corresponding roller 1110 and a flexible drive member 1112.

It is, therefore, apparent that there is provided, in accordance with the various embodiments disclosed herein, removable track drives.

While the invention has been described in conjunction with a number of embodiments, it is evident that many alternatives, modifications and variations would be or are apparent to those of ordinary skill in the applicable arts. Accordingly, Applicant intends to embrace all such alternatives, modifications, equivalents and variations that are within the spirit and scope of the invention.

What is claimed is:

1. A removable track drive comprising:
   a truck configured for supporting a vehicle tire and having two rollers adapted to contact respective surfaces of the vehicle tire;
   a track disposed around an exterior of the truck and configured to pass over top of the vehicle tire so as to be moved by rotation of the vehicle tire; and
   a linkage adapted to couple the removable track drive to another removable track drive.

2. A removable track drive comprising:
   a truck configured for supporting a vehicle tire and having two rollers adapted to contact respective surfaces of the vehicle tire;

a track disposed around an exterior of the truck and configured to pass over top of the vehicle tire so as to be moved by rotation of the vehicle tire; and a compulsory drive having a first rotating portion coupled to a vehicle wheel, a second rotating portion coupled to one of the rollers and a flexible drive member.

3. The removable track drive of claim 2, further comprising a linkage coupling the truck to a frame of the vehicle.

4. The removable track drive of claim 2, wherein the rollers are adjustable on the truck.

5. The removable track drive of claim 2, wherein the first rotating portion and the second rotating portion are gears and the flexible drive member is a chain.

6. The removable track drive of claim 2, wherein the first rotating portion and the second rotating portion are pulleys and the flexible drive member is a belt.

7. The removable track drive of claim 2, wherein the track includes a plurality of first members and a plurality of second members arranged in an alternating fashion.

8. The removable track drive of claim 7, wherein the plurality of first members and the plurality of second members are substantially the same height.

9. The removable track drive of claim 7, wherein the plurality of first members is formed from metal and the plurality of second members is formed from rubber.

10. The removable track drive of claim 2, further comprising a linkage adapted to couple the removable track drive to another removable track drive.

\* \* \* \* \*